(12) United States Patent
Merritt

(10) Patent No.: US 8,201,540 B2
(45) Date of Patent: Jun. 19, 2012

(54) INTERNAL COMBUSTION ENGINE

(76) Inventor: Dan Merritt, Coventry (GB)

( * ) Notice: Subject to any disclaimer, the term of this patent is extended or adjusted under 35 U.S.C. 154(b) by 241 days.

(21) Appl. No.: 12/666,150

(22) PCT Filed: Jun. 16, 2008

(86) PCT No.: PCT/GB2008/002060
§ 371 (c)(1),
(2), (4) Date: Jun. 2, 2010

(87) PCT Pub. No.: WO2009/001033
PCT Pub. Date: Dec. 31, 2008

(65) Prior Publication Data
US 2010/0236519 A1   Sep. 23, 2010

(30) Foreign Application Priority Data
Jun. 23, 2007   (GB) .................................. 0712185.8

(51) Int. Cl.
*F02B 19/08* (2006.01)

(52) U.S. Cl. ......... 123/263; 123/262; 123/306; 123/309
(58) Field of Classification Search .......... 123/260–263, 123/286, 306, 307, 309
See application file for complete search history.

(56) References Cited

U.S. PATENT DOCUMENTS

| | | | | |
|---|---|---|---|---|
| 2,902,011 | A | * | 9/1959 | Heinrich ........................ 123/279 |
| 4,038,952 | A | * | 8/1977 | Nagano ......................... 123/259 |
| 4,124,000 | A | | 11/1978 | Genslak |
| 4,248,192 | A | | 2/1981 | Lampard |
| 4,332,224 | A | * | 6/1982 | Latsch et al. ................... 123/254 |
| 4,534,327 | A | * | 8/1985 | Latsch et al. ................... 123/263 |
| 5,086,735 | A | * | 2/1992 | Melchior et al. .......... 123/65 VD |
| 5,243,940 | A | * | 9/1993 | Gopel ............................ 123/299 |
| 5,307,772 | A | * | 5/1994 | Rao et al. ....................... 123/272 |
| 5,392,744 | A | * | 2/1995 | Regueiro ....................... 123/262 |
| 7,387,103 | B2 | * | 6/2008 | Merritt ........................... 123/253 |
| 2006/0169241 | A1 | * | 8/2006 | Merritt ........................... 123/257 |
| 2007/0051338 | A1 | | 3/2007 | Merritt |

* cited by examiner

*Primary Examiner* — Erick Solis
(74) *Attorney, Agent, or Firm* — Pedersen and Company, PLLC; Ken J. Pedersen; Barbara S. Pedersen

(57) ABSTRACT

A reciprocating internal combustion engine. The present invention improves the spark ignition facility used by the engine inventions described in patent publications WO2005/052335 and WO2007/080366 by providing a device to ensure reliable spark ignition by protecting the spark plug from malfunction by sooting.

5 Claims, 2 Drawing Sheets

INTERNAL COMBUSTION ENGINE

This application is a 35 U.S.C. 371 national entry, non-provisional application of PCT/GB2008/002060, international filing date Jun. 16, 2008, which claims priority of GB 0712185.8, filed Jun. 23, 2007.

This invention relates to spark ignited reciprocating internal combustion engines capable of operating over a large part or all of their functioning range without restricting its air intake at part load.

This invention describes the detailed design of the location of the spark plug used in such engines which are described in the international patent publication numbers WO2005/052335 and WO2007/080366.

Accordingly this invention provides an internal combustion engine comprising;

a piston reciprocating in a cylinder;
air inlet means communicating with the cylinder;
exhaust means communicating with the cylinder;
an indirect combustion chamber communicating with the cylinder comprising a near end and a far end in relation to the piston;
transfer orifice communicating with the cylinder and the combustion chamber at its near end; means to promote air movement within the combustion chamber in helical swirl motion having tangential velocity component around the combustion chamber and an axial velocity component along the combustion chamber, the axial velocity component being directed away from the near end and towards the far end;
at least one fuel injector communicating with the combustion chamber;
a controller to control the fuel injection process and spark ignition event;
spark ignition means communicating with the combustion chamber at its far end;
characterised in that the far end of the combustion chamber has a substantially concentric protrusion into the chamber facing the near end which forms an annular groove with the periphery of the combustion chamber, the protrusion containing a hole for a spark plug which communicates with the said groove through an aperture allowing the spark to be exposed to the air fuel mixture rotating in the said groove to enable direct spark ignition of the mixture.

The invention is further described herein by way of example with reference to accompanying schematic diagrams which are not drawn to scale and are presented for illustration purposes only.

Figure 1:
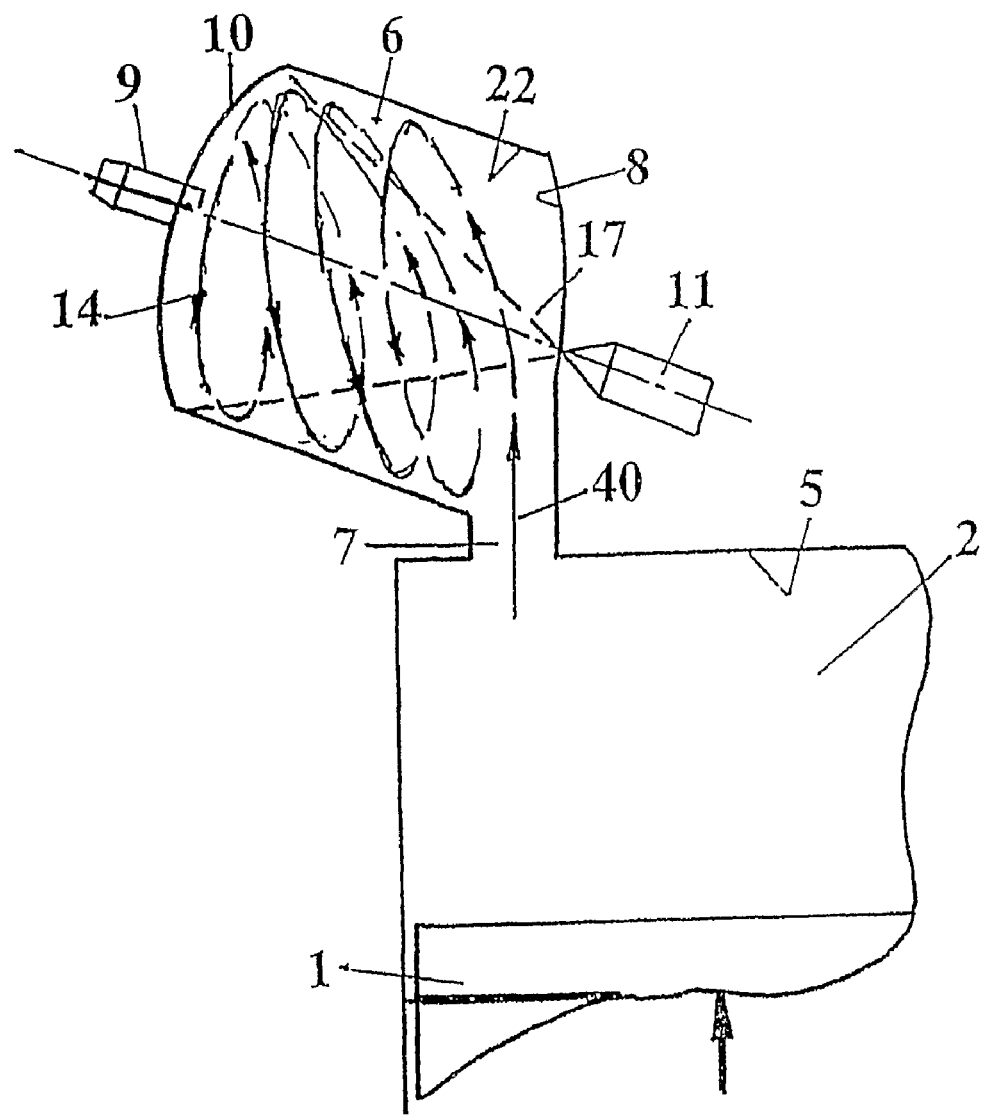
Figure 2:
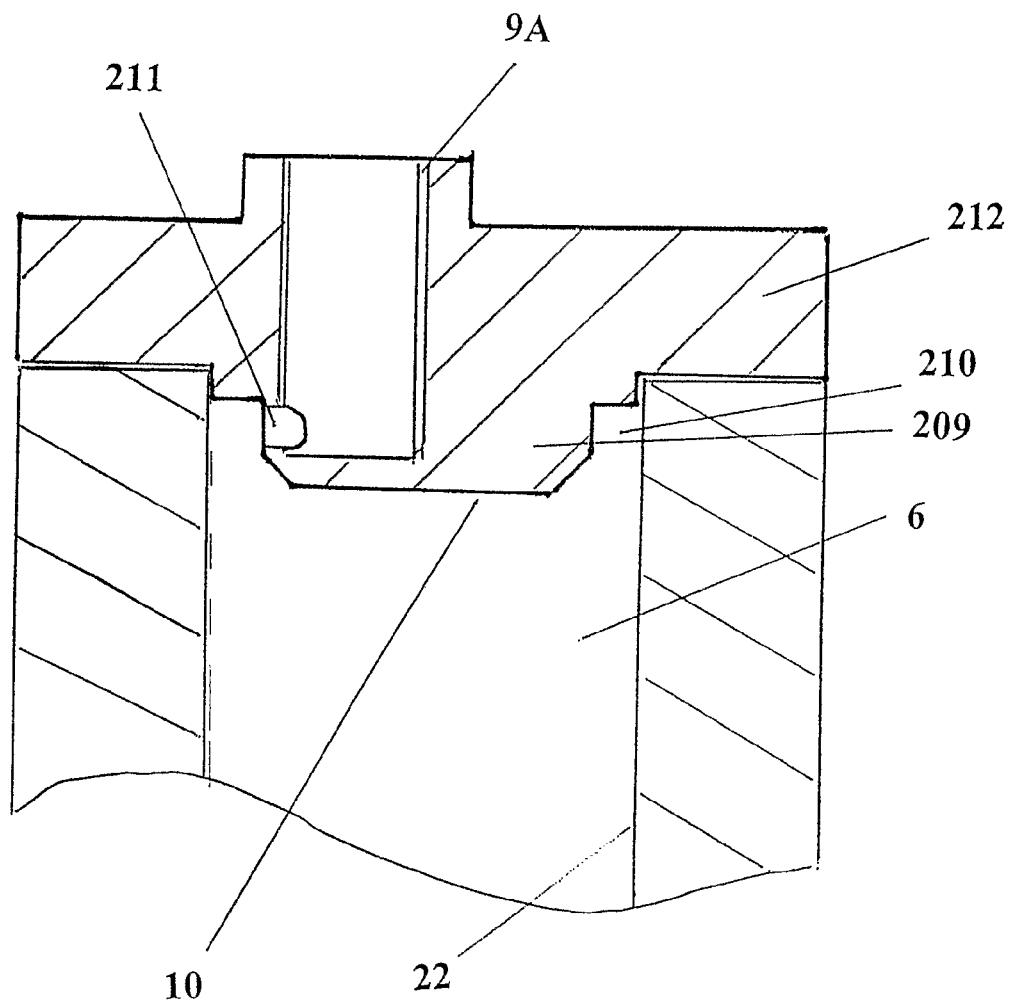

FIG. 1 illustrates a combustion chamber design as part of an engine described in international patent publications WO2005/052335 and WO2007/080366. (FIG. 1 shows a transfer orifice 7 which is inclined to the axis of the combustion chamber as in patent publication WO2005/052335 but the present invention is equally applicable to an engine where the transfer orifice is perpendicular to the axis of the combustion chamber as described in patent publication WO2007/080366); and FIG. 2 illustrates a partial section of the combustion chamber along its axis.

In the arrangement of FIG. 1 the piston 1 moves upwardly as drawn in cylinder 2 during the compression stroke. The combustion chamber 6 shown in this embodiment is cylindrical and communicates with cylinder 2 through transfer orifice 7. The fuel injector 11 delivers fuel across the air jet 40 towards the far end of the combustion chamber 10 where spark plug 9 is situated. The diagram also illustrates a streamline 14 rotating around the periphery 22 of the combustion chamber in helical swirl motion. Transfer orifice 7 enters the combustion chamber adjacent to its periphery in order to impart swirl to the air moving in the chamber and an inclined helical ramp situated at the near end of the chamber 8 (not shown) imparts a longitudinal velocity component to the air entering the chamber to promote helical swirl motion. Cylinder 2 communicates with inlet and exhaust valves (not shown) in known fashion.

Controlling the timing of the start of fuel injection ensures that some of the fuel spray cone 17 reaches the far end of the combustion chamber 10 during the early part of the compression stroke before it is fully absorbed into the air jet 40 entering the combustion chamber through transfer orifice 7 because the magnitude of the air jet velocity and the air density are smaller at the start of the compression stroke and increase substantially towards the end of the compression stroke. When this fuel reaches the far end 10 at the earlier part of the compression stroke it may be deposited on the wall there but it soon vaporises when the helical swirl air flow arrives at the far end with sufficient magnitude.

This ensures that the spark plug 9, situated near the far end can be supplied with an ignitable air fuel mixture irrespective of the distribution of fuel nearer the near end 8 of the combustion chamber.

A difficult practical problem associated with the invention of patent publications WO2005/052335 and WO2007/080366 is the need to avoid wetting the spark plug with liquid fuel during the early part of the fuel injection process. Fuel injector 11 points directly at the spark plug 9 at the far end 10 making this unavoidable. After such wetting the spark plug electrodes soon become covered with carbon soot which conducts electricity and extinguishes the spark.

Attempts were made to solve this problem by using an ignition pot, a device well known to engine designers. These allowed the engine to function but proved unsatisfactory in practice. Ignition pots are small cavities of a fixed volume, which contain the electrodes end of the spark plug and communicate with the combustion chamber through a hole. When applied to the engine inventions described in publications WO2005/052335 and WO2007/080366, the communication hole was situated on the far end face of the combustion chamber 10 and was machined inclined to the axis of the combustion chamber to stop direct entry of fuel spray through this communication hole.

The principle of the ignition pot is to allow gas, in this case air fuel mixture, to be compressed into the ignition pot cavity during the compression stroke. After ignition the burning gases emerge from the ignition pot cavity under pressure as a plasma or a flaming jet igniting the mixture outside. The problems encountered when used with the above engine invention was the inability of the ignition pot to ensure ignition in every engine cycle, resulting in misfires, possibly because of failure to remove from the ignition pot products of combustion of an earlier cycle.

FIG. 2 illustrates the device invented to solve this problem. It is self evident that unless reliable spark ignition can be achieved with an engine according to the inventions described in patent publications WO2005/052335 and WO2007/080366 such engines cannot function reliably.

In FIG. 2 the end cap 212 is attached to the far end of the combustion chamber 6 by bolts (not shown), but the end cap can be made integral with the combustion chamber if desired.

The end cap contains a screw threaded hole shown as 9A with a screw thread which secures the spark plug (not shown). The spark plug hole is shown eccentric to the axis of the combustion chamber to allow close proximity to the periphery. The end cap shown contains a cylindrical protrusion 209 which is substantially concentric with the combustion chamber and which projects into the combustion chamber over a short distance; it is shown with a bevelled free end as a preferred embodiment.

The protrusion forms an annular groove 210 with the periphery of the combustion chamber. It has been found that the radial width of this annular groove is important for the operation of the device as it contains the swirling air fuel mixture which, during the compression stroke, is concentrated around the periphery of the chamber 22, under the influence of centrifugal force. The radial width of the annular groove will depend on the intensity of the helical swirl flow chosen by the designer to influence the speed of combustion and needs to be optimised for a given engine geometry.

Facing the annular groove in one location is a slot 211 communicating between the spark plug electrodes and the groove 210. The spark plug electrodes are placed substantially opposite the slot. The slot can be made with a substantial length around the periphery of 209, for example four times its height, but is preferably placed around the thinnest wall between the eccentric spark plug hole 9A and annular groove 210, provided that incandescence is avoided. Spark plug hole 9A is placed in an eccentric position to the protrusion 209 in order to reduce the thickness of the wall around the slot 211.

The present invention prevents liquid fuel from being directly deposited on the spark plug electrodes since the slot 211 is, in this embodiment, placed on a wall parallel with the axis of the combustion chamber. It also allows a generous opening between the spark plug electrodes and the rest of the combustion chamber to minimise the amount of products of combustion remain around the spark plug after ignition to upset the ignition of subsequent cycles. The spark plug electrodes can have a direct line of sight with the air fuel mixture rotating in annular groove 210.

The present invention is crucially important since it allows the engine to operate reliably without spark malfunction. It is not an obvious solution to a man skilled in the art but is a result of substantial research and development on an engine test bed, it has been found to work extremely well.

The invention claimed is:

1. An internal combustion engine comprising
   a piston reciprocating in a cylinder;
   air inlet means communicating with the cylinder;
   exhaust means communicating with the cylinder;
   an indirect combustion chamber communicating with the cylinder comprising a near end and a far end in relation to the piston;
   a transfer orifice communicating with the cylinder and the combustion chamber at its near end;
   means to promote air movement within the combustion chamber in helical swirl motion having tangential velocity component around the combustion chamber and an axial velocity component along the combustion chamber, the axial velocity component being directed away from the near end and towards the far end;
   at least one fuel injector communicating with the combustion chamber;
   a controller to control the fuel injection process and spark ignition event;
   spark ignition means communicating with the combustion chamber at its far end;
   characterised in that the far end of the combustion chamber has a substantially concentric protrusion into the chamber facing the near end which forms an annular groove with the periphery of the combustion chamber the protrusion contains a hole for a spark plug which communicates with the said groove through an aperture allowing the spark to be exposed to the air fuel mixture rotating in the said groove to enable direct spark ignition of the mixture.

2. An engine according to claim 1 wherein the aperture is in the form of a slot.

3. An engine according to claim 1 wherein the protrusion is cylindrical.

4. An engine according to claim 3 wherein the protrusion has a bevelled edge at its free end.

5. An engine according to claim 1 wherein a fuel injector delivers fuel towards the far end of the combustion chamber.

* * * * *